(12) United States Patent
Mejia

(10) Patent No.: US 7,938,409 B2
(45) Date of Patent: May 10, 2011

(54) CARRIAGE AND INCORPORATED HARNESS WITH DAMPING MECHANISMS FOR IMPROVED TOWING AND STABILITY OF THE CARRIAGE

(76) Inventor: Mauricio Mejia, Denver, CO (US)

( * ) Notice: Subject to any disclaimer, the term of this patent is extended or adjusted under 35 U.S.C. 154(b) by 264 days.

(21) Appl. No.: 12/424,947

(22) Filed: Apr. 16, 2009

(65) Prior Publication Data
US 2009/0261540 A1 Oct. 22, 2009

Related U.S. Application Data

(60) Provisional application No. 61/045,474, filed on Apr. 16, 2008.

(51) Int. Cl.
*B62B 7/02* (2006.01)
(52) U.S. Cl. .................. 280/1.5; 280/47.34; 224/184
(58) Field of Classification Search .................. 180/1.5, 180/204, 47.24, 47.131, 47.34, 47.38; 224/184
See application file for complete search history.

(56) References Cited

U.S. PATENT DOCUMENTS

| | | |
|---|---|---|
| 367,142 A | 7/1887 | Heyligenstaedt |
| 660,598 A | 10/1900 | Stonebridge |
| 2,343,019 A | 2/1944 | Neal |
| 4,236,723 A | 12/1980 | Lemmon |
| 4,335,875 A | 6/1982 | Elkin |
| 4,848,780 A | 7/1989 | Straub |
| 5,062,651 A | 11/1991 | Varieur |
| 5,106,108 A | 4/1992 | Howell |
| 5,244,217 A | 9/1993 | Kotulla |
| 5,265,891 A | 11/1993 | Diehl |
| 5,375,861 A | 12/1994 | Gifford |
| 5,622,294 A | 4/1997 | Evans |
| 5,735,361 A | 4/1998 | Forrest |
| 5,842,444 A | 12/1998 | Perrulli |
| 6,006,968 A | 12/1999 | McCarthy et al. |
| 6,027,001 A | 2/2000 | Levitan |
| 6,039,333 A | 3/2000 | Hamblin |
| 6,131,917 A | 10/2000 | Walsh |
| 6,139,033 A | 10/2000 | Western |
| 6,349,949 B1 | 2/2002 | Gorringe |
| 6,685,198 B1 | 2/2004 | Hartman |
| 7,007,956 B1 | 3/2006 | Pinon |
| 7,114,731 B2 | 10/2006 | Malrick |
| 7,246,802 B2 | 7/2007 | Yeung |
| 7,311,313 B1 * | 12/2007 | Ray et al. ...................... 280/1.5 |
| 2001/0030402 A1 | 10/2001 | White |
| 2001/0043000 A1 | 11/2001 | Hinds |
| 2003/0067130 A1 | 4/2003 | Gordon |
| 2003/0111813 A1 | 6/2003 | Assaf et al. |
| 2004/0016781 A1 | 1/2004 | Smith |
| 2007/0187910 A1 | 8/2007 | Adams |
| 2008/0238024 A1 * | 10/2008 | Heidenreich et al. ......... 280/266 |

* cited by examiner

*Primary Examiner* — Kevin Hurley
(74) *Attorney, Agent, or Firm* — Sheridan Ross P.C.

(57) ABSTRACT

A carriage and incorporated harness and towing assembly which allows for significant freedom of movement for a user and a safe and comfortable ride for a passenger is disclosed. The towing assembly comprises a flexible, semi-resilient member surrounded by a plurality of rigid linkages, a fixed towing member and a harness coupling member. The carriage is comprised of at least a single, two-wheel axis and at least one motion damping device. One object of the disclosure is to provide an apparatus that allows a user to comfortably tow a child, toddler or infant while participating in a variety of exercise or general travel-related activities.

2 Claims, 5 Drawing Sheets

CARRIAGE AND INCORPORATED HARNESS WITH DAMPING MECHANISMS FOR IMPROVED TOWING AND STABILITY OF THE CARRIAGE

CROSS-REFERENCE TO RELATED APPLICATIONS

This application claims the benefit of U.S. Provisional Patent Application No. 61/045,474, filed on Apr. 16, 2008, the entirety of which is incorporated by reference herein.

FIELD OF THE INVENTION

The present invention relates generally to passenger carriages. More specifically, it relates to a carriage that may accommodate at least one passenger, such as a child, while being attached to a user during exercise or travel, and a harness adapted for such use.

BACKGROUND

A variety of devices are known for towing humans in a cart or carriage. Among these devices are horse drawn sulkies, rickshaws, and towed carriages for attachment to bicycles. These devices are generally suited for constant linear motion with little consideration given to the forces encountered in various accelerations in both the horizontal, vertical and tangential directions. Typically, one or more rigid members are applied to connect the carriage to the host user. These members create a direct connection between the user and the carriage which is necessary to maintain a constant distance between the two. This rigidity of the structure provided in prior art devices, however, generates complications with steering and negotiating sharp hills and corners, particularly for use by a user while jogging or walking.

Additionally, prior art devices call for a rigid carriage system with little impact absorption outside of what may be achieved by tires, suspension systems or seat materials. The lack of damping in these devices allows for the natural yet unpredictable motion of running or walking to be imparted upon the carriage, creating an uncomfortable and potentially unsafe ride for the passenger. Likewise, the various forces applied to the carriage through the ground or other surface on which the carriage rides are translated to the user. This results in an uncomfortable experience for the host user and an uncomfortable ride for the passenger(s).

SUMMARY OF THE INVENTION

Thus there is a need to provide a carriage and a harness for pulling or towing the carriage which addresses these and other problems associated with prior art devices, and that otherwise provides a user with the ability to tow loads of varying weights while exercising, such as during walking, running, skating, skiing, or any other desired activity. There is further the need to provide a harness that is both comfortable to the user and allows a wide range of motion during travel and accommodates the towing of a carriage carrying one or more persons. There is even a further need to provide an improved dampening or suppression component or system, which reduces the impact of the motion of the user on the carriage and vice versa, and provides for the overall comfort and stability of the occupant(s) of the carriage.

One aspect of the present disclosure is to provide a carriage which may be attached to a user while still allowing for complete freedom of movement and minimize the impacts of the carriage's natural movement on the user as well as reducing the impacts of the natural motion of the user upon the carriage. The following are incorporated by reference herein in their entireties: U.S. Pat. No. 5,062,651 entitled "Jogging Baby Carriage"; U.S. Pat. No. 2,343,019 entitled "Tractor-Trailer Combination"; and U.S. Pat. No. 660,598 entitled "Bicycle-Tender."

Another aspect of the present disclosure is to provide a safe and comfortable ride for the passenger by employing a semi-flexible linkage towing member, a fixed towing member, and a motion suppression system. The following are incorporated by reference herein in their entireties: U.S. Pat. No. 7,007,956 entitled "Harness Device, Kit and Method of Using Same"; U.S. Des. Pat. No. 367,142 entitled "Body Harness for Towing"; and U.S. Pat. No. 4,335,875 entitled "Jogging Rope Harness."

Another aspect of the present disclosure is to provide a system which allows the user to include a child, toddler or infant in a variety of exercise or general travel activities, thus allowing the user to engage in activities that would otherwise be impractical, as well as conferring the benefits of outdoor exposure and stimulation upon the passenger.

Yet another aspect of the present disclosure is to provide such a carriage of sturdy, lightweight construction that will occupy minimal space when stowed or otherwise placed in storage.

Thus, in one particular embodiment, a carriage is disclosed comprising:

at least two wheels interconnected by a common axis;

a frame assembly supported by the at least two wheels, where at least two opposing pairs of damping devices are positioned adjacent the frame assembly and each of the at least two wheels;

a harness for attachment to a user;

a tow assembly for towing the carriage, the tow assembly comprising a ball joint coupled to at least one connection member, the at least one connection member comprised of a substantially flexible, semi-resilient member surrounded by a plurality of rigid linkages; and a seat or platform supported by the frame assembly for accommodating at least one passenger.

It will be appreciated by those skilled in the art that the concepts presented herein are applicable for use with a variety of other conveyances other than the carriage listed above and/or described in the detailed description below, such as sleds, rickshaws, pedicabs, bicycle taxis, wagons, buggies and trailers, to name a few. Furthermore, the carriage as disclosed may include a number of embodiments for pulling behind a person on skates or on skis, including cross-country skis. Therefore, although the drawing figures depict a carriage with wheels, it is to be expressly understood that a modified carriage with runners, like the type associated with a sleigh, would operate with and is contemplated with the present invention. It is therefore to be understood that the present invention includes a variety of different versions or embodiments, and this Summary is not meant to be limiting or all-inclusive. That is, this Summary provides general descriptions of certain embodiments, but may also include more specific descriptions of certain other embodiments. Furthermore, the use of the terms carriage and/or harness, together or in conjunction with one another, is not intended to be limiting in any respect, and it is to be expressly understood that use of an equivalent device, alone or in conjunction with another device, consistent with the scope of the appended claims, is considered to be within the scope of the present disclosure.

Accordingly, various embodiments of the present invention are illustrated in the attached figures and described in the detailed description of the invention as provided herein and as embodied by the claims. For a detailed description of how these objects are accomplished by the present invention, reference should be made to the accompanying drawings and descriptive language that follows, as well as the appended claims.

The drawings are not necessarily to scale, and may, in part, include exaggerated dimensions for clarity.

DETAILED DESCRIPTION OF THE INVENTION

With reference to the specific drawing figures contained herein, the present disclosure is directed to components and apparatus generally related to a towed trailing vehicle, herein referred to as a carriage, for carrying a person(s) substantially as depicted and described herein, including various embodiments, subcombinations, and subsets thereof. Specifically, the disclosure comprises in varying embodiments a carriage, a suspension system for the carriage, a harness for securing the carriage to a host, and a linkage between the carriage and the harness for towing the carriage behind the person wearing the harness during walking, jogging, cycling, skiing, skating, or other activity. According to various embodiments disclosed herein, the linkage between the harness and the carriage may be comprised of a combination of rigid and non-rigid member(s), which may be fewer or greater on number than those depicted in the accompanying drawing figures, and which extend a specified length between the carriage to the harness as necessary for the desired activity.

Figure 1:
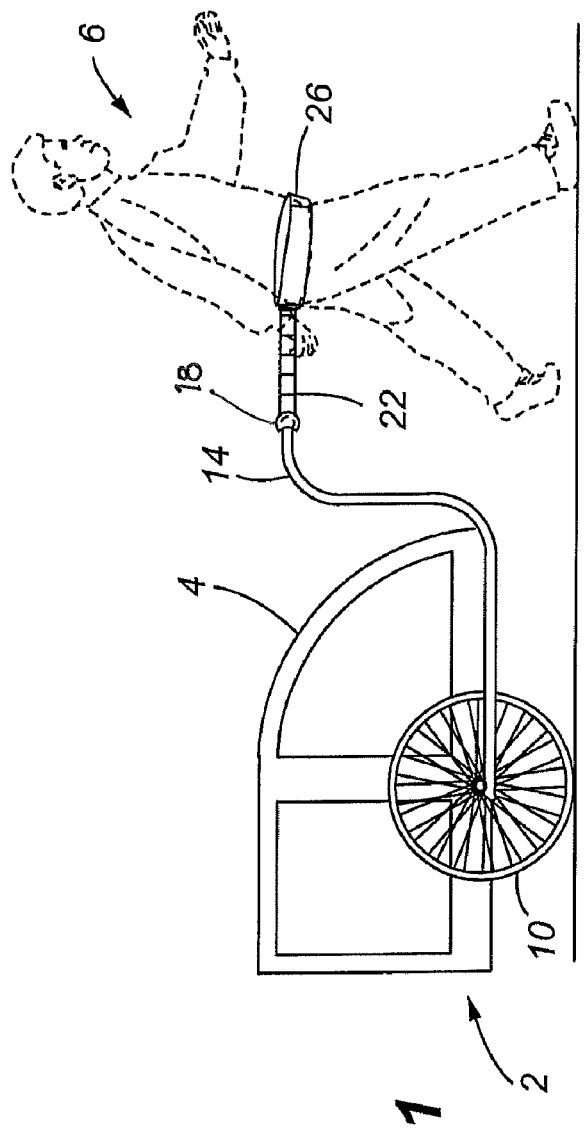
FIG. 1 is a front elevation view of the carriage and harness according to one embodiment of the present disclosure.

FIG. 1 shows a plan view of the preferred embodiment of the assembly where a carriage 2 is supported by rotating wheels 10 and connected to the host by connection means including coupling members 14 and 22, joint 18 and harness 26. Coupling member 14 is preferably constructed of a lightweight rigid material to reduce the overall weight of the assembly while providing sufficient resistance to loads bearing on the coupling member 14. Primarily, this coupling member 14 acts to resist tension and compression. However, it should be of sufficient strength to resist any unforeseen loading, such as torsion due to ground irregularities, which may cause imbalance due to varying elevations of the wheels 10.

Coupling member 14 is preferably constructed with a rise or bend to allow the carriage 2 to rest horizontally while still being attached to a host by a belt or harness 26 attached at a location higher than where coupling member 14 attaches to the carriage 2. The rise or bend also permits the carriage 2 and coupling member 14 to be tilted slightly downwardly when not in use and maintain the carriage 2 in a semi-fixed position relative to the axis of the wheels 10. Joint 18 is preferably a hinged, pivot or other rotational connection that allows coupling members 14, 22 to move relative to one another over a limited range while still providing adequate support between coupling members 14, 22 to pull or tow the carriage 2 during use.

According to one alternative embodiment, coupling member 14 may further comprise at least one telescoping assembly, wherein a first length of coupling member 14 is partially contained within a second length of coupling member 14, and wherein the first length is slightly narrower in width than the second length of coupling member 14 to permit the first length to be telescopically engaged with the second length. The coupling member may further comprise an adjustable screw, such as a set screw, for retaining the position of the first length relative to the second length of the coupling member 14 once the desired height has been set. This telescopic engagement permits a user to adjust the height of the bend in the coupling member 14, thereby allowing the coupling member to adjust to varying heights of users and preference of the user in where they position the harness 26. In yet another alternative embodiment, this telescopic engagement may include a friction fit between the first and second length of the coupling members to allow the lengths to move relative to each other during use. This engagement further permits users to configure the height of the coupling member 14 before use, but allows the height of the coupling member 14 to automatically adjust during use. In this embodiment, the first length may further comprise a flange on one distal end and the second length may further comprise a lip having a diameter slightly narrower than the flange to prevent the first length becoming disengaged from the second length during use.

Coupling member 22 in a preferred embodiment is constructed of a flexible interior member surrounded by a series of rigid linkages that allow for slight deformation of the coupling member 14 in a nearly uniform manner about all directions, or about one or more specific directions, as will be explained in greater detail below with reference to FIGS. 5 and 6. This construction is provided to improve steering ability while still providing adequate resistance to compression loads incurred when slowing or stopping. Harness 26 is preferably constructed as a waist belt that is adjustable to accommodate a variety of users. In many forms of exercise, it is desirable if not essential to have full range of motion. Thus, harness 26 is designed to contact the user only around the waist while providing sufficient comfort via the material and positioning of the harness 26 so as not to interfere with the user's arms, hips or other moving body parts when the apparatus is in use.

According to a preferred embodiment, a canopy or housing 4 is provided to shelter the passenger from weather and debris as well as provide additional safety. The housing 4 is preferably constructed of a lightweight, flexible yet durable material, such as a woven fabric or synthetic material, and optionally with a screen or window for allowing the passenger to view the user and the user to view the passenger while the carriage 2 is in motion. Although some level of transparency is desirable, it is not necessary. In certain circumstances, such as bright sun, it may be desirable to have a housing 4 made from a material or combination of materials that filter or block light. Therefore, housing 4 may be composed of multiple layers of different transparency, which can be applied or removed based on conditions.

Figure 2:
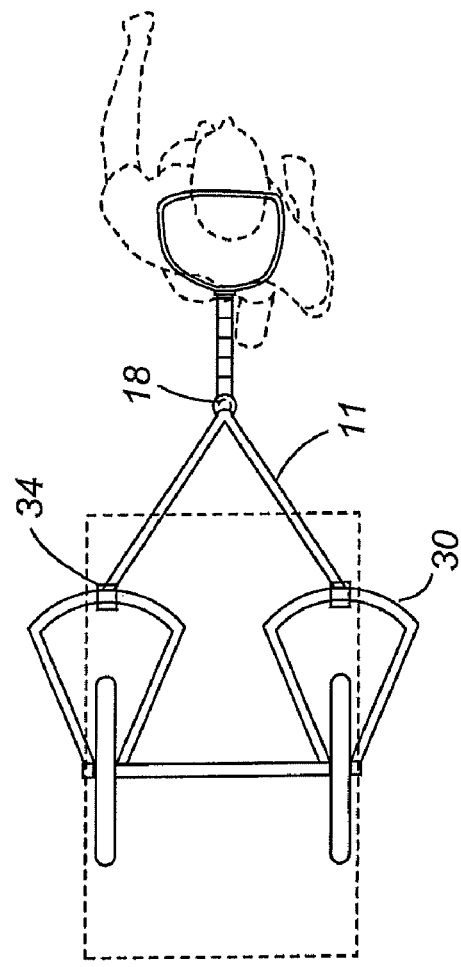
FIG. 2 is a top view of the embodiment shown in FIG. 1.

FIG. 2 shows a top view of one embodiment of the invention where attachment members 34 are used to connect multiple coupling members 11 to the carriage 2. Attachment members 34 are preferably mounted to frame members 30 in such a way to allow horizontal translation along frame members 30. This translation allows forces directed from the user 6 to impart a greater force on the carriage 2, for example, when turning or rounding a gradual bend in the path of travel, and further allows for greater steering capability, especially around tight corners and/or small radii turns. As the present disclosure in a preferred embodiment seeks to provide a system that requires minimal user manipulation, no conventional steering means are necessary for the wheels 10 to turn or to otherwise provide directional forces upon the carriage 2. Rather, frame members 30 and attachment members 34 act to steer the carriage 2 by responding to a user's movement. Frame members 30 are anchored at the axle adjacent each wheel 10, while providing a point of attachment for the coupling members 11 at a distance away from the wheels 10, and preferably with both the flexibility to permit orientation of the frame members 30 to pivot about their longitudinal axis during turns or bends in the path of travel, while at the same time providing sufficient rigidity to allow one frame member 30 to advance one end of the axle (and thus one wheel) slightly ahead of the opposite end of the axle, as may be required when rounding a sharp turn or bend. Furthermore, the spacing between frame members 30 allows for greater moment to be applied to the carriage 2, particularly when turning, thus requiring less effort from the host to steer the carriage 2.

Figure 3:
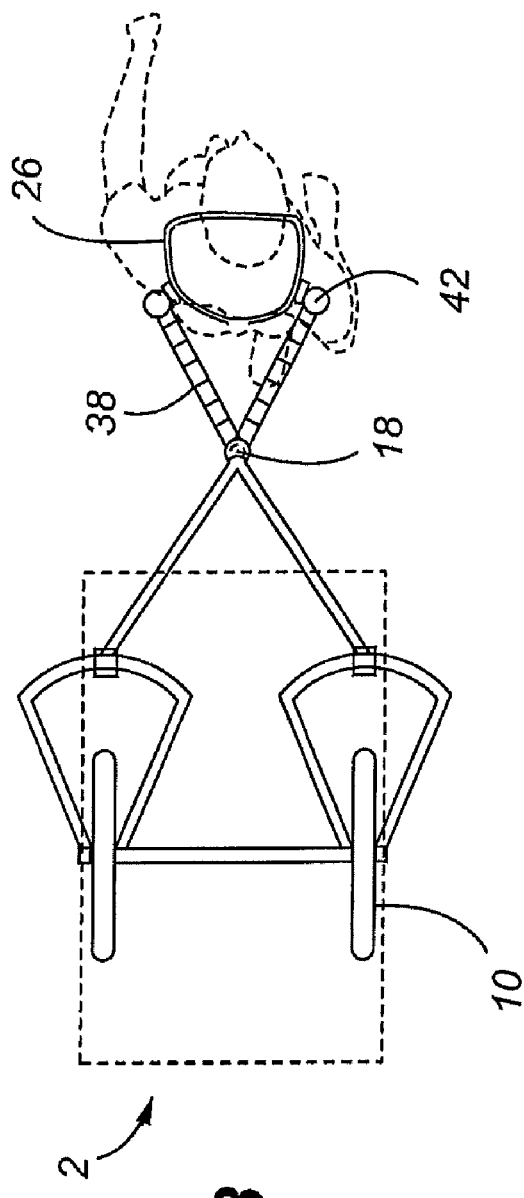
FIG. 3 is a top view of the carriage and harness according to another embodiment of the present disclosure.

FIG. 3 is a top view of another embodiment of the invention where multiple coupling members 38 connect joint 18 to the harness 26. The two coupling members 38 are at least partially complementary, in that when tension is applied along the direction of travel the coupling members 38 tend to act in unison to provide equal support. However, these coupling members 38 allow for a force to be applied to the carriage 2 in response to the host's movements, thus allowing the carriage 2 to appropriately track or follow the host with minimal physical and/or mental effort from the host. These coupling members 38 are particularly well suited for negotiating tight radii turns. With a single attachment to the harness 26, coupling members 38 may apply tangential forces upon the host when turning, due in part to the momentum of the carriage 2, and thus create an unsafe situation. By placing the contact point of each coupling member 38 further to the sides of harness 16, the coupling members 38 allow the host to place greater force on the carriage 2, thus overcoming this problem.

Figure 4:
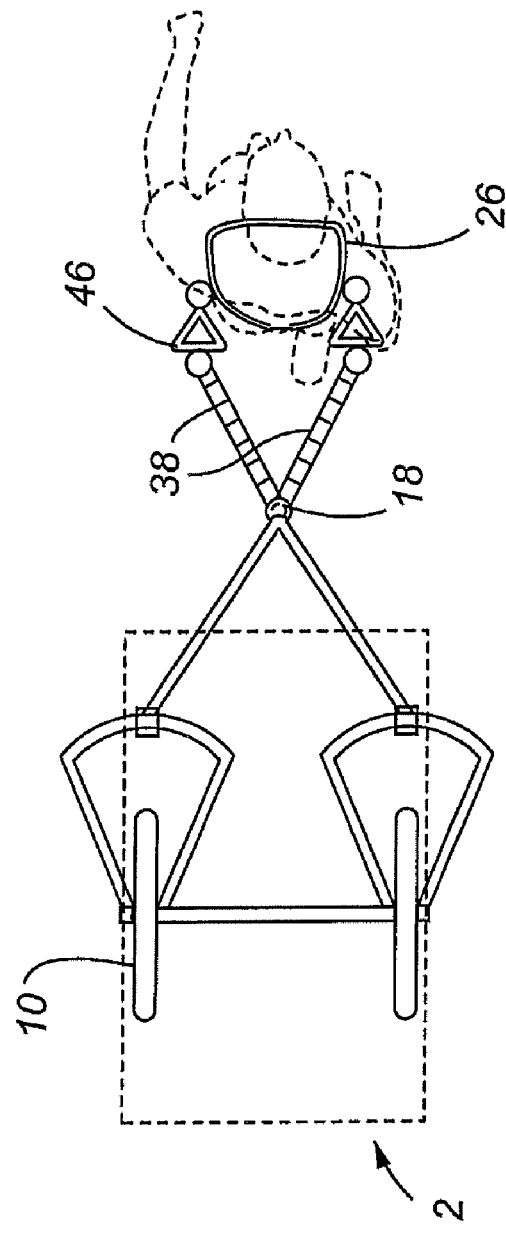
FIG. 4 is a top view of the carriage and harness according to yet another embodiment of the present disclosure.

FIG. 4 is another embodiment employing attachment members 46 attached to coupling members 38 which reduce the potential for interference between coupling members 38, harness 26 and the host. FIG. 4 shows these members 38 as generally triangular in shape, however one of ordinary skill in the art would recognize a variety of other connection means to perform the desired function equally well. For instance, D-rings and carabineer type connections may be substituted for this purpose. Attachment members 46 may be connected to the harness 26 by a variety of methods. Preferably, attachment members 46 utilize clips or fastening hooks attached to built-in loops or extensions on the harness 26.

Figure 5:
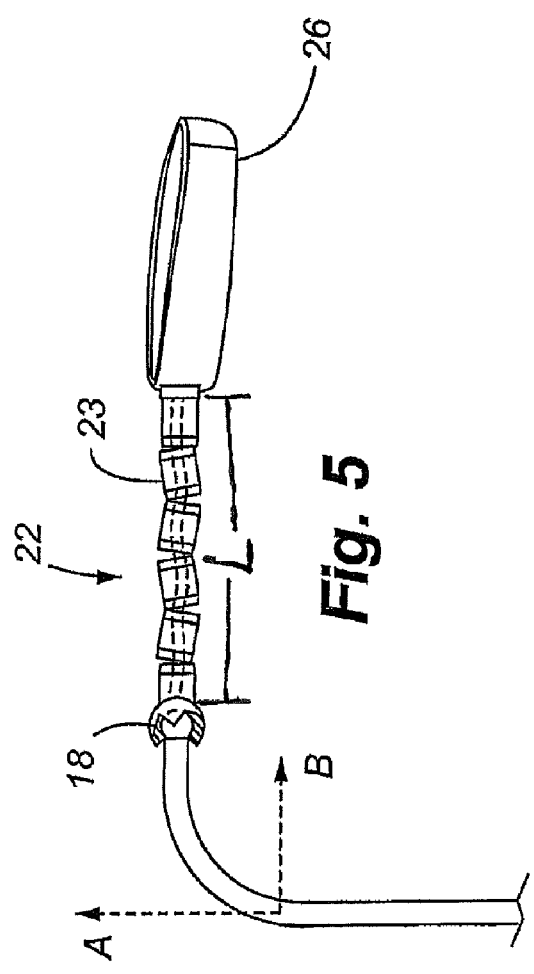
FIG. 5 is a partial view of the devices for connecting the harness to the carriage for the embodiment shown in FIG. 1.

FIG. 5 is a detailed view of a connection between the rigid members and the semi-rigid members of the harness assembly according to one particular embodiment of the disclosure. In this embodiment, the connection is made by a nearly frictionless connection device or ball joint 18, which is coupled to coupling member 22, and thereby coupled to harness 26. Harness 26 according to this embodiment is preferably a single band or loop of material that attaches at the user's waist, as it is desirable to remain unencumbered by additional and unnecessary materials while walking, jogging or exercising. Therefore, in order to reduce contact points without an undue increase in pressure on the user's body, the harness 26 is preferably constructed from flexible, padded material that is of sufficient dimensions in both the A and B axes to provide adequate comfort, yet not so substantial as to impede the natural jogging, running or walking motions. Additionally, the harness 26 should be adjustable to accommodate a wide range of waist sizes, either through conventional belt holes or tightening straps, including but not limited to Velcro straps for increasing/decreasing the length of harness 26 about a user's waist.

Figure 6:
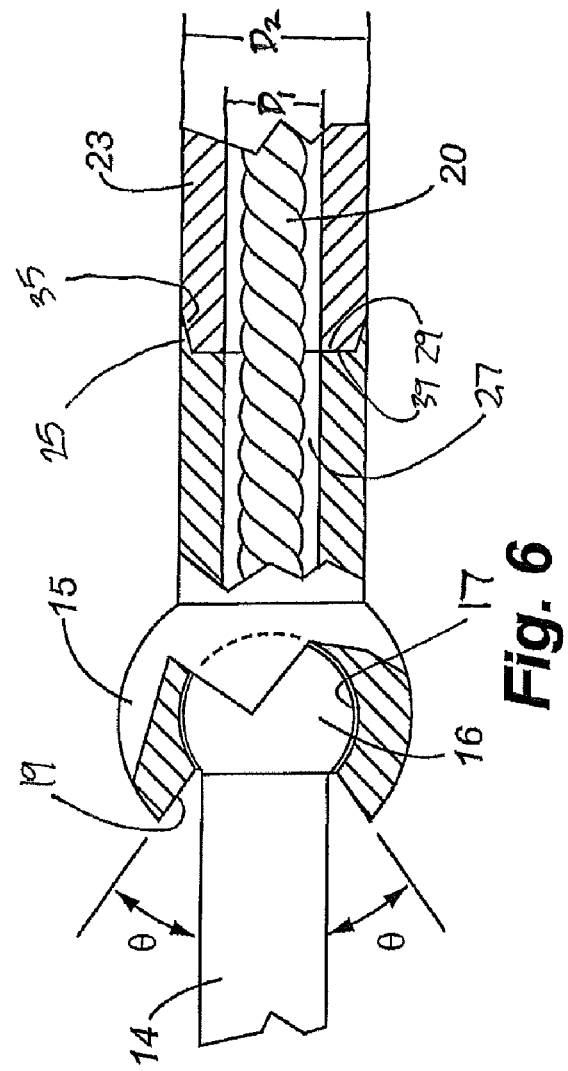
FIG. 6 is a partially exploded view of the devices shown in FIG. 5.

Referring now to FIG. 6, coupling member(s) 22 according to this embodiment is preferably comprised of a pretensioned flexible cord 20 encased in a series of rigid linkages 23. This unique configuration supplies a member that is self-aligning when tension is applied, yet allows for flexibility in the lateral, vertical and tangential directions to assist in turning and to reduce oscillations between the user and the carriage 2. This flexibility improves the steering ability of the carriage 2 while greatly reducing the forces applied to the carriage through natural running and walking motions, as well as the forces the user may experience through impact applied through the carriage via ground irregularities. Adjacent surfaces 25, 35 and 29, 39 are substantially congruent when the linkages 23 are concentrically aligned in series about the flexible cord 20. This congruence provides for a friction fit between the adjacent linkages 23 while still providing freedom of movement relative to one another when changes in slope or direction of travel are experienced. Additionally, the coupling member(s) 22 is preferably designed so that even when maximum strain is applied to the flexible cord 20, the linkages 23 will not become decoupled from each other. This is accomplished by the intimate connections of mating surfaces 25, 35 that do not achieve full separation in the B axis even under maximum strain and elongation of the flexible cord 20.

In addition, linkages 23 are designed so that a tolerance 27 is provided between the linkages 23 and the flexible cord 20. This tolerance 27 allows for relative movement between the flexible cord 20 and the linkages 23 and anticipates expansion and contraction of both features due to temperature, humidity, and other external factors. As shown in FIG. 6, the linkages 23 when placed in series combine to form a composite hollow assembly with inner diameter $D_1$, and outer diameter $D_2$. The flexible cord 20 is therefore contained within $D_1$ and necessarily has a diameter less than $D_1$. In one embodiment the diameter of the flexible cord 20 is such that tolerance 27 approaches zero.

According to one alternative embodiment, the flexible cord 20 may be slightly longer than required to allow the user to adjust the tensioning in the flexible cord 20 by allowing more or less slack within the series off linkages 23. For example, the flexible cord 20 may be coupled to the harness 26 in a fashion that allows the user to attach the flexible cord 20 to the harness 26 at multiple points along the flexible cord 20. This may be accomplished by providing a crimp connector that locks into place around the desired location of the flexible cord 20, or alternatively may be accomplished by providing a reel and winding assembly along the portion of the harness 26 closest to the user's lower back, which allows the unwanted length of flexible cord 20 to be wound about the reel, or to unwind additional length of flexible cord 20 as desired. This is important for allowing the user to customize the tension in the flexible cord 20 to adjust for increased or decreased towing loads, relative slope along the terrain or path of travel, and personal preference and/or running style. This aspect may also be necessary when changing from one type of activity to another type of activity, such as jogging in the summer months and cross-country skiing during the winter months. Certain activities may require more tolerance or "play" in the flexible cord 20 than others, and by allowing the user to adjust the tension in the flexible cord 20, a variety of different activities and preferences may be accommodated.

According to a preferred embodiment, the sum total effective length of the linkages 23, when oriented as shown in FIG. 6, should be slightly less than the length of the inner flexible cord 20 when stretched to its end range. In the most preferred embodiment of the present invention, this total linkage length represents approximately 95-100% of the fully strained flexible cord 20. However, this total length of the linkages 23 may represent as little as 85% of the length of flexible cord 20 in one embodiment, 90% in a more preferred embodiment and 95% in the most preferred embodiment. One of ordinary skill in the art will recognize that lower ratios between linkage length and strained cord length will translate to greater separation along the B axis between linkages 23 when tension is applied to the flexible cord 20. Therefore, it is recognized that the significance of these relative lengths is to ensure that the linkages 23 will not become dislocated or otherwise significantly separated from one another during use, and will return to the congruent mated position previously described when tension is removed.

In various alternative embodiments, the linkages 23 may be comprised of various other shapes and sizes to permit the necessary axial and torsional distortions described herein. For example, the linkages 23 may be more cube-shaped, as opposed to the cylindrical shaped linkages 23 shown in the Figures, which have a longer longitudinal axis that a lateral axis, in order to allow greater flexing among the series of linkages 23. The linkages may further comprise, in varying embodiments, only one sloped or cambered surface on at least one distal end for encouraging flexing about that direction. To explain in greater detail, in one embodiment the linkage may have a sloped or cambered surface oriented to permit the linkage to pivot against the adjacent linkage in a single axis, such as the A axis shown in FIG. 5. This slope or cambered surface is preferably on one or more of the end surfaces, which face the adjacent linkages, and which encourage the linkages to flex to a degree such that the sloped or cambered surface of the linkage comes to rest against the adjacent linkage, but no further. In this orientation, the linkages collectively allow the series of linkages and flexible cord to flex only in a single direction. In further alternative embodiments, the linkages may comprise sloped of cambered surfaces about more than a single axis, thus allowing flexing in two or more axes. Variations on the number of surface and use of complementary adjoining surfaces of adjacent linkages is contemplated, and it is to be expressly understood that other orientations and number of sloped or cambered surfaces is believed to be within the scope of the present invention.

Therefore, according to various embodiments described herein, the apparatus provides the benefits of a rigid member in tension and compression while also allowing for limited flexibility and maneuverability. The contributions of coupling member 22 to the comfort of the passenger and the host, maneuverability of the carriage 2, and overall safety provide significant improvements over the prior art. One of ordinary skill will readily recognize a variety of materials that may be used to form the linkages 23. FIG. 5 exaggerates the spacing of these linkages 23 for the purpose of illustration, and it is expressly understood that the degree to which the flexible cord 20 or other similar semi-elastic or elastic member is pretensioned may vary, as described above, depending on the loading on the carriage 2, the type of activity engaged in by the user, or other factors. One of ordinary skill in the art will recognize that in order to perform their desired function, the linkages 23 require relatively intimate connections between each other, but still allow for a limited degree of movement, as previously discussed. It should also be recognized that these linkages 23 rely on their physical proximity to one another to fulfill their purpose, as opposed to adhesive or bonding means. As the flexible cord of 20 coupling member 22 accommodates the majority of the tensile stress applied in towing the carriage 2, a wide variety of materials could be used to form the linkages 23. By way of example, these materials may include, but are not limited to plastics such as polyethylene, polyurethane, ABS or other synthetic materials, or a more sturdy material such as steel, stainless steel, aluminum, brass, copper, nickel, and alloys of any of the aforementioned materials. In addition, although not shown in FIG. 6, the linkages 23 may be covered by an additional material to avoid children's or the user's fingers being pinched, and to prevent damage to the rigid linkages. This covering material or sleeve may be made from a variety of materials, including by way of example but not limitation, nylon, elastic material, semi-elastic material, neoprene, mesh, woven reinforced polyethylene, vinyl-coated polyester, vinyl-coated nylon, or vinyl laminated polyester.

FIG. 6 illustrates the ball joint 18 that connects the coupling members 14, 22. The ball joint 18 provides the advantage of freely pivoting about any axis, while still providing support under tension and/or compression loading. This freedom of movement allows for users of various heights to be able to use the invention without changing the pitch of the trailing carriage 2 or making adjustments to the height or link of coupling member 14. The relative movement permitted by the ball joint 18 with respect to the coupling members 14, 22 allows for the user and the carriage 2 to negotiate both subtle and abrupt changes in slope along the path of travel, and further allows the user to walk or jog without having the user's feet or legs come into contact with the carriage 2. However, in order to prevent sagging, the movement permitted by the ball joint 18 should be limited to a reasonable degree, and the tension in the flexible cord 20 should be such that little or no slack is presented when the carriage 2 is in a downhill path of travel. As show in FIG. 6, the ball joint 18 should preferably limit the angular displacement $\Theta$ of the coupling members 14, 22 to angles between 0 and 60 degrees, and in the most preferred embodiment no greater than 45 degrees. This limited range therefore allows the carriage 2 to track the user's direction of travel even when negotiating sharp turns.

The inner ball 16 is substantially spherical in shape, with a diameter slightly less than the interior diameter of the socket 17, thereby creating an interference fit when the ball 16 is inserted. Appropriate materials are employed for both the ball 16 and the socket 17 to provide minimal resistance due to friction between the two as well as withstand wear and abrasion due to contact. Additional steps may be taken to achieve these goals, such as polishing the inner surface of the socket 17 and applying appropriate means of lubrication between the two surfaces 16, 17.

Figure 7:
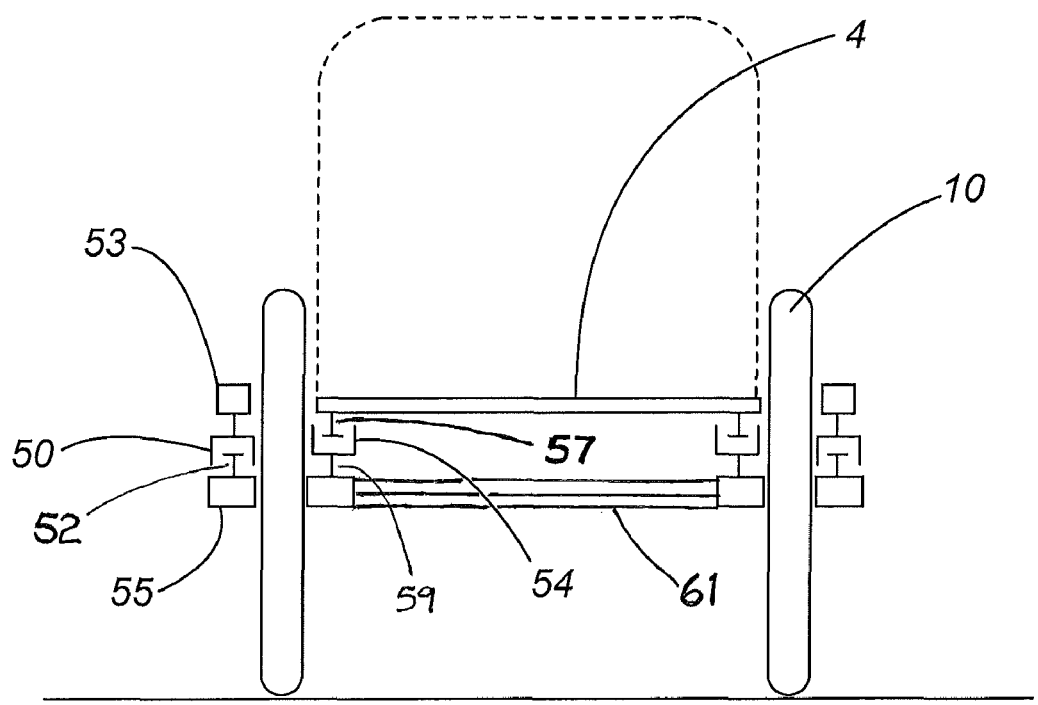
FIG. 7 is a partial front elevation view of the carriage according to the embodiment shown in FIG. 1.

FIG. 7 is a partial front view of the carriage 2. The view depicts a pair of damping devices 50, 54 that are oriented to reduce the net effect of impacts upon both the wheels 10 and thereby upon the carriage 2. One set of damping devices 50 are positioned outside of the wheels 10 and operate to absorb the energy imparted upon the wheels through impact with irregularities in the traveling surface. The damping devices 50 therefore contribute to overall efficiency of the invention by promoting contact with the traveling surface and the overall safety of the invention by increasing the predictability of carriage movement. Damping devices 50 act in series with damping devices 54 to further stabilize carriage movement. Damping devices 54 are depicted as being located between the wheels 10 to stabilize and balance the carriage 2, and are preferably positioned in the opposite longitudinal direction as damping devices 50.

It is well known in the art that larger wheel diameters provide advantageous travel qualities with the inherent disadvantages of increased weight and size of the apparatus. The suspension system described herein allows for improved travel qualities while still employing small wheel diameters to reduce weight and storage size. Finally, these devices include but are not limited to coil springs, leaf springs, beam springs, torsion springs, hydraulic devices such as cylinders, and/or elastomer or elastomeric materials.

FIG. 7 shows according to a preferred embodiment the location and orientation of the damping devices 50, 54. This drawing is not intended to limit the invention to the depicted arrangement. The essential device of the disclosure in this regard is that suspension/damping means for both the wheels 10 and the frame assembly for the carriage 2 work in concert to stabilize and improve carriage travel. For example, in one embodiment, damping devices 50, 54 are oriented in opposing directions so that a first end 53 of a damping device 50 is directed in a generally upward direction while the corresponding end of the other damping device 54 is oriented in a generally downward direction.

To illustrate this opposite orientation by way of example but not limitation, damping devices 50, 54 of FIG. 7 are located on opposite ends of the wheel and adjacent to the axle 61 of the carriage. The damping device 54 located on the interior side of the wheel supports the housing 4, which serves as the base of the carriage and supports the passengers of the carriage. This damping device 54 supports the housing 4 by being coupled to the axle 61. This coupling is not a fixed coupling, but one that allows the axle 61 to rotate and permit movement of the carriage, while at the same time supporting the damping device 54, which further serves to dampen any vibrational forces experienced by the axle 61 due to irregularities on the ground surface or path of travel of the carriage. One method for such a coupling would be a sleeve or similar cylindrical coupling that surrounds the axle 61 adjacent the wheel, although other coupling mechanisms are contemplated without departing from the novel aspects of the present disclosure. As shown by the damping device 54 in FIG. 7, the damping device 54 includes a fixed section 59 and a moveable section 57 that operate in conjunction to dampen the forces during experienced by the wheels and axle 61 during travel. In one embodiment, the fixed section 59 could by a hydraulic cylinder, where the moveable section 57 is the piston or arm of that hydraulic cylinder, which may translate about a generally vertical axis to absorb or dampen the movements of the wheels and axle 61. The moveable section 57 is oriented downwardly on this damping device 54. By comparison, the damping device 50 located on the exterior of the wheel has a moveable section 52 that is oriented upwardly, thus creating an opposite directional damping force in relation to the interior damping device 54. The damping devices 50, 54 oriented this way do not cancel each other out, but rather act in series to further reduce forces experienced by the carriage during travel.

It is also recognized and should be appreciated that the damping devices 50, 54 need not be located on opposite sides of the wheel 10 as depicted in FIG. 7. In order to achieve the primary goals of the carriage suspension system, damping devices 50, 54 may both be located within the wheels 10 such that they each oriented in opposing arrangements. Similarly, these damping devices may both be located externally of the wheels 10 where they may dampen forces upwardly, downwardly, and oriented in opposing or substantially similar directions.

Figure 8:
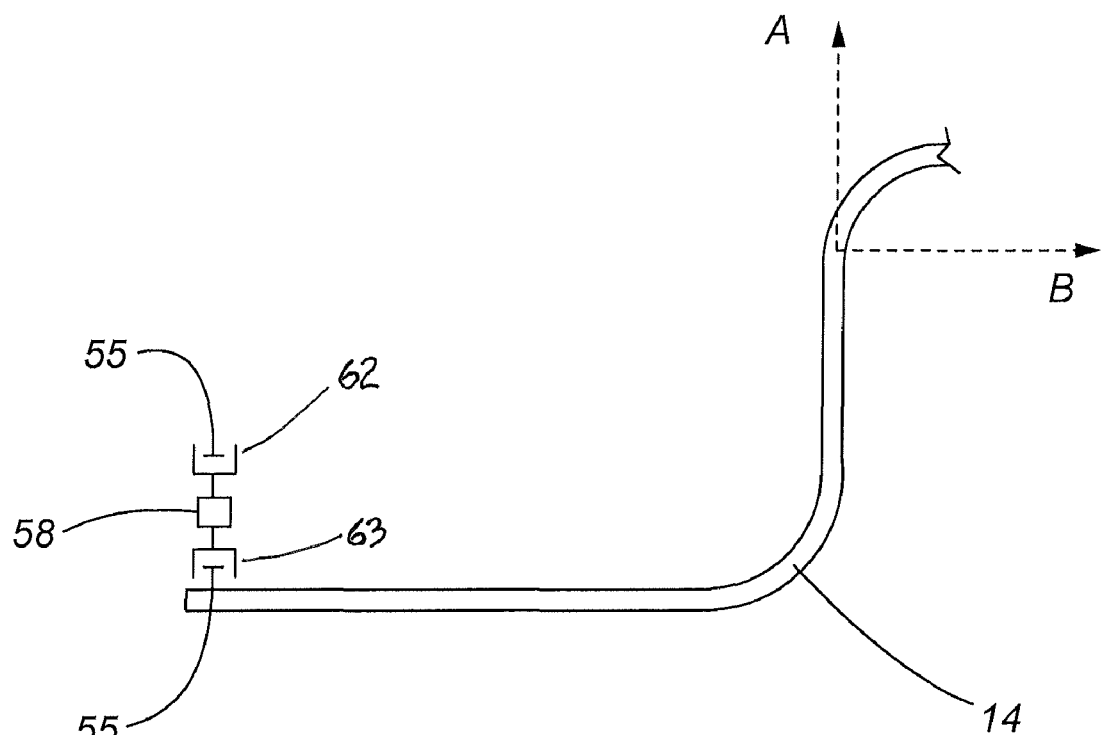
FIG. 8 is a partial side elevation view of the carriage according to the embodiment shown in FIG. 1.

FIG. 8 is a partial side view of one embodiment of the carriage depicting a modified damping device 58. The upper portion 62 of the damping device 58 is positioned to support and to dampen forces translated to the carriage 2, and functions to stabilize the ride and provide comfort to the passenger by damping the displacement along the A axis that would naturally result from irregularities in the surface and other external factors. The lower portion 63 of the damping device 58 acts in series with the upper portion 62 to dampen the carriage 2 oscillations and provide comfort for the host. As described in greater detail above in relation to FIG. 7, these damping devices preferably include damping elements 55 that are oriented in opposite directions to improve the stability of the carriage 2 and the enjoyment of the passenger, and to further improve the ability of the user to tow the carriage 2 without unwanted disturbances due to the jostling or bouncing of the carriage 2. Damping device 58 may be located on the interior or exterior sides of the wheels and adjacent to the axle of the carriage 2.

This orientation further reduces the amount of the carriage's motion along the A axis that is noticed by the user while still providing adequate resistance in tension and compression along the B axis. In this arrangement, compression forces are normalized by the bidirectional orientation of the damping device 58 which includes damping elements 55 which act both upwardly and downwardly along the A axis. This arrangement may be utilized either independently or in conjunction with any of the previously disclosed embodiments, for example, those embodiments described in relation to FIG. 7.

By reducing accelerations along the A axis, this system allow for more efficient and safer carriage travel while also reducing the vibrations and undesired movement on the host, including oscillations that combine over time to create what is commonly referred to as the "pogo" effect. The various components/members described above act in series with each other to create an even, smooth and comfortable ride for the passenger. By further separating the carriage 2 from ground forces, the damping device 58 acts to ensure that carriage travel is as linear as possible. In addition to creating a more comfortable experience for the passenger, damping device 58 also functions to segregate the forces experienced by each user. Specifically, vertical motion imparted to the carriage 2 is prevented from acting on various members and disturbing those forces to the host. Likewise, natural running or other motions by the host are not transferred to the carriage 2. One of ordinary skill in the art will recognize that any number of typical shock absorption devices may be used to achieve this goal.

Figure 9:
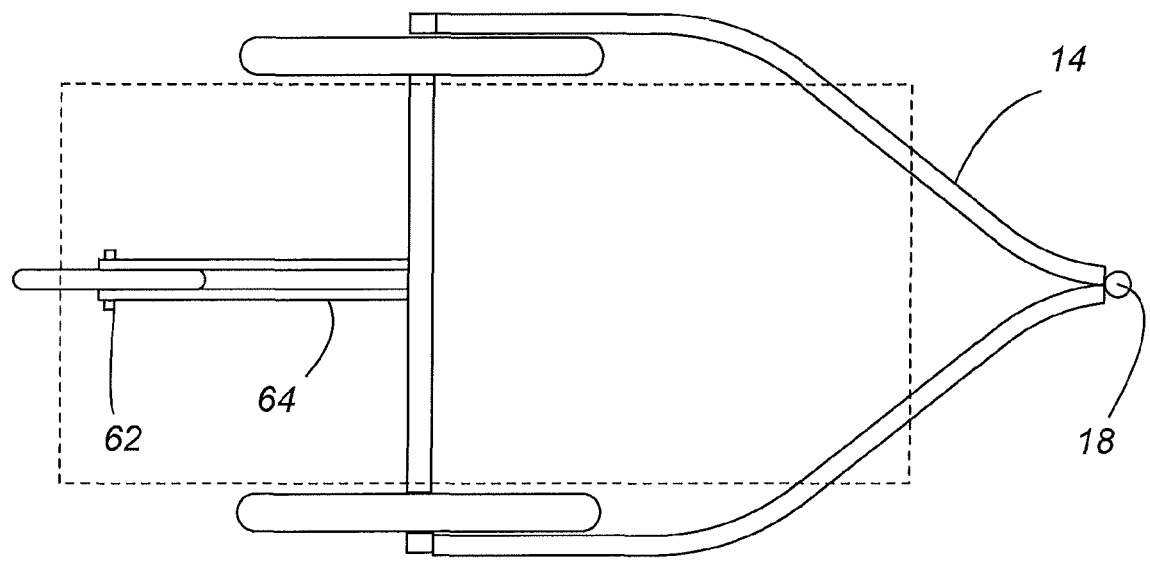
FIG. 9 is a top view of the carriage and harness according to another embodiment of the present disclosure.

FIG. 9 illustrates another embodiment of the invention using three wheels. The third wheel 62 is depicted as being positioned at the distal end of the carriage 2 opposite the user. Although this embodiment is preferred because the third wheel 62 is less likely to interfere with the user's movement, it would perform the same function if were positioned at the proximate end of the carriage 2. In this embodiment, previously discussed damping devices (not shown in FIG. 9) may be employed on any one or all three wheels or solely on the primary wheels 10 with the third wheel 62 serving as merely a trailing/guiding wheel. The third wheel 62 is depicted as being connected to the axle of the carriage 2 by member 64. In lieu of being connected to the axle, this wheel 62 may also be mounted to the carriage 2 at other locations, such as the distal end of the frame.

Figure 10:
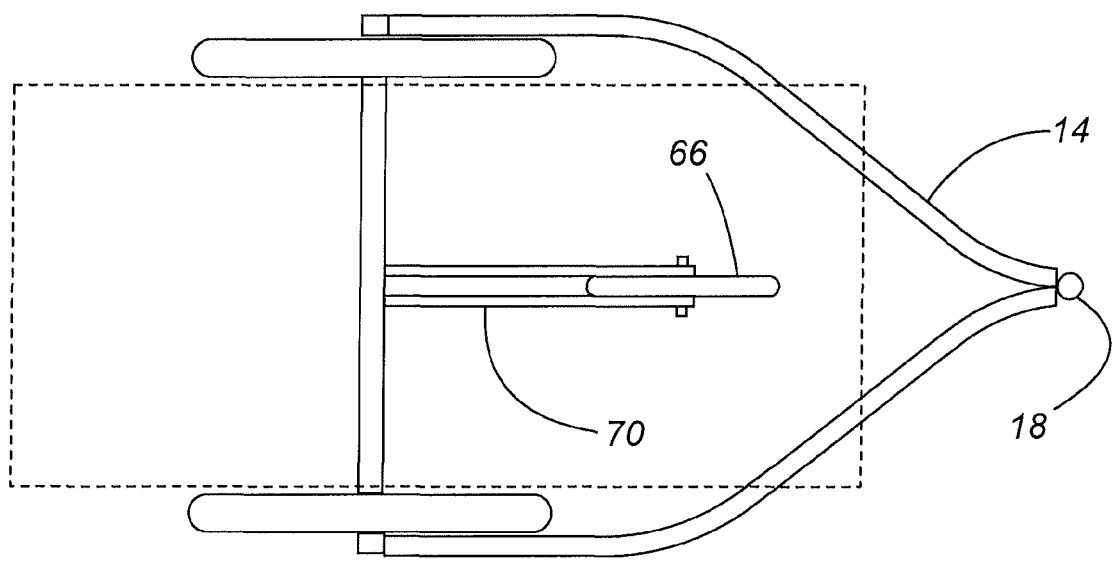
FIG. 10 is a top view of the carriage and harness according to yet another embodiment of the present disclosure.

FIG. 10 is a further embodiment of a carriage employing three wheels, similar to FIG. 9. Wheel 66 is shown as being connected by member 70 to the carriage 2. However, as previously discussed, a variety of other methods could be employed to connect this wheel 66 to the carriage 2. Preferably the third wheel 62 of FIG. 9 and the wheel 66 of FIG. 10 are pivotally mounted to members 64, 70 to allow the greatest degree of flexibility with respect to movement of the carriage 2 in relation to the user's path of travel (i.e., to permit the direction of the third wheels to pivot about a fixed point as required when the user makes a turn or changes the direction of travel).

Those of skill in the art will understand how to make and use the present invention after understanding the present disclosure, including the variety of materials that would achieve the desired results. The present invention, in various embodiments, includes providing devices in the absence of items not depicted and/or described herein or in various embodiments hereof, including in the absence of such items as may have been used in previous devices or processes, e.g., for improving performance, achieving ease and\or reducing cost of implementation.

It should be noted that one of the ordinary skill in the art would recognize the intended host for this invention to include but not be limited to runners, walkers, rollerbladers, and other pedestrians who wish to incorporate a child into their activity. It should also be noted that the apparatus disclosed herein could be easily modified to couple to a user who is positioned on a bicycle, or alternatively coupled to the bicycle itself, without departing from the novel aspects disclosed herein. Furthermore, it is to be expressly understood that devices other than a carriage may be employed without departing from the novel aspects of the present disclosure for transporting objects other than a child, such as devices for carrying supplies, groceries, weights (for improving performance or training purposes), or other objects desired by the runner, cyclist, walker or other user.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. It is to be understood that certain aspects of the disclosure have utility apart from the combination with other aspects, or as an entire assembly. Thus, the following claims are hereby incorporated into this Detailed Description.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A carriage, comprising:
   at least two wheels interconnected by a common axis;
   a frame assembly supported by the at least two wheels, where at least two opposing pairs of damping devices are positioned adjacent the frame assembly and each of the at least two wheels;
   a harness for attachment to a user;
   a tow assembly for towing the carriage, the tow assembly comprising a ball joint coupled to at least one connection member, the at least one connection member comprised of a substantially flexible, semi-resilient member surrounded by a plurality of rigid linkages; and
   a seat or platform supported by the frame assembly for accommodating at least one passenger.

2. The carriage according to claim 1 wherein the material of the substantially flexible, semi-resilient member is selected from the group consisting of nylon, elastic material, semi-elastic material, neoprene, mesh, woven reinforced polyethylene, vinyl-coated polyester, vinyl-coated nylon, or vinyl laminated polyester.

\* \* \* \* \*